US012742973B2

(12) United States Patent
Bai

(10) Patent No.: US 12,742,973 B2

(45) Date of Patent: Sep. 22, 2026

(54) OPTICAL MODULE WITH DOUBLE EMITTER CHIPS AND DOUBLE DOVE PRISMS

(71) Applicant: Lumentum Operations LLC, San Jose, CA (US)

(72) Inventor: John G. Bai, San Jose, CA (US)

(73) Assignee: Lumentum Operations LLC, San Jose, CA (US)

(*) Notice: Subject to any disclaimer, the term of this patent is extended or adjusted under 35 U.S.C. 154(b) by 982 days.

(21) Appl. No.: 18/055,518

(22) Filed: Nov. 15, 2022

(65) Prior Publication Data

US 2024/0045221 A1 Feb. 8, 2024

Related U.S. Application Data

(60) Provisional application No. 63/370,559, filed on Aug. 5, 2022.

(51) Int. Cl.
*G02B 27/09* (2006.01)

(52) U.S. Cl.
CPC ..... *G02B 27/0916* (2013.01); *G02B 27/0972* (2013.01)

(58) Field of Classification Search
CPC ........................ G02B 27/0916; G02B 27/0972
USPC .......................................................... 359/831
See application file for complete search history.

(56) References Cited

U.S. PATENT DOCUMENTS

| | | | | |
|---|---|---|---|---|
| 8,437,086 B2 | 5/2013 | Du et al. | | |
| 2018/0191135 A1* | 7/2018 | Yanase | ................ | H01S 5/02326 |

OTHER PUBLICATIONS

Unmounted Dove Prisms. THORLABS. 7 pages. [Retrieved on Nov. 8, 2022 from https://www.thorlabs.com/newgrouppage9.cfm?objectgroup_id=146].

* cited by examiner

*Primary Examiner* — Wyatt A Stoffa
*Assistant Examiner* — Mitchell T Oestreich
(74) *Attorney, Agent, or Firm* — Harrity & Harrity, LLP

(57) ABSTRACT

An optical module may include a diode laser with dual emitters respectively configured to emit a first laser beam and a second laser beam in a beam propagation direction. The optical module may include a fast axis collimator (FAC) arranged to collimate the first and second laser beams in a vertical direction relative to the beam propagation direction and a slow axis collimator (SAC) arranged after the FAC to collimate the first and second laser beams in a horizontal direction relative to the beam propagation direction. The optical module may include a pair of Dove prisms between the FAC and the SAC, with respective axes rotated relative to the first emitter and the second emitter such that the first laser beam and the second laser beam swap fast and slow axes and are stacked in a fast axis direction after passing through the Dove prisms.

20 Claims, 16 Drawing Sheets

500

OPTICAL MODULE WITH DOUBLE EMITTER CHIPS AND DOUBLE DOVE PRISMS

CROSS-REFERENCE TO RELATED APPLICATION

This Patent Application claims priority to U.S. patent application Ser. No. 63/370,559, filed on Aug. 5, 2022, and entitled "OPTICAL MODULE WITH DOUBLE EMITTER CHIPS AND DOUBLE DOVE PRISMS." The disclosure of the prior Application is considered part of and is incorporated by reference into this Patent Application.

TECHNICAL FIELD

The present disclosure relates generally to high-power fiber-coupled diode laser modules for pump applications and to a laser chip with dual emitter chips and dual Dove prisms to rotate and stack two laser beams in a fast axis direction.

BACKGROUND

In an optical system, beam quality generally refers to a measure of how tightly a laser beam can be focused under certain conditions (e.g., with a limited beam divergence). For example, a high beam quality implies smooth wavefronts (e.g., a strong phase correlation across the beam profile) such that focusing the beam with a lens enables the beam to be focused where the wavefronts are planar. On the other hand, a beam with poor beam quality may have scrambled wavefronts that make beam focusing more difficult (e.g., the beam divergence for a given spot size is increased). One metric that is often used to quantify beam quality is a beam parameter product (BPP), which is defined as the product of the beam radius (measured at the beam waist) and the beam divergence half-angle (measured in the far field). In general, beam quality decreases as the BPP value increases and vice versa (e.g., a higher BPP is associated with a lower beam quality and a lower BPP is associated with a higher beam quality), where the minimum achievable BPP value is $\lambda/\pi$, which corresponds to an ideal Gaussian beam with a wavelength $\lambda$. For example, the minimum possible BPP value for a beam that has a 1064 nanometer (nm) wavelength is about 0.339 millimeters times milliradians (mm-mrad). In some cases, the BPP may remain unchanged or may increase minimally (e.g., does not get worse) when a beam is sent through non-aberrative optics, such as a thin lens (e.g., if the lens generates a focus with a smaller radius or a larger radius at the beam waist, the beam divergence will increase or decrease correspondingly). However, non-ideal optics can lead to a significant increase in the BPP value, which can spoil the beam quality. For example, the BPP value can significantly increase in cases where one or more optical components cause the beam radius to increase without a corresponding decrease in the beam divergence half-angle.

SUMMARY

In some implementations, an optical module includes a diode laser that includes a first emitter configured to emit a first laser beam in a beam propagation direction and a second emitter configured to emit a second laser beam in the beam propagation direction; a fast axis collimator (FAC) arranged to collimate the first laser beam and the second laser beam in a vertical direction relative to the beam propagation direction; a slow axis collimator (SAC) arranged after the FAC to collimate the first laser beam and the second laser beam in a horizontal direction relative to the beam propagation direction; a first Dove prism arranged between the FAC and the SAC; and a second Dove prism arranged between the FAC and the SAC, wherein the first Dove prism and the second Dove prism include respective axes that are rotated relative to the first emitter and the second emitter such that the first laser beam and the second laser beam swap fast and slow axes and are stacked in a fast axis direction after passing through the first Dove prism and the second Dove prism.

In some implementations, an optical assembly includes a coupling FAC (CFAC) and a coupling SAC (CSAC) arranged to couple multiple laser beams into an optical fiber; and an array that includes multiple optical devices arranged in one or more rows, wherein the multiple optical devices each include: a diode laser that includes a first emitter configured to emit a first laser beam in a beam propagation direction and a second emitter configured to emit a second laser beam in the beam propagation direction; a FAC arranged to collimate the first laser beam and the second laser beam in a vertical direction relative to the beam propagation direction; a SAC arranged after the FAC to collimate the first laser beam and the second laser beam in a horizontal direction relative to the beam propagation direction; a first Dove prism arranged between the FAC and the SAC; a second Dove prism arranged between the FAC and the SAC; and a mirror, arranged after the SAC, to direct the first laser beam and the second laser beam toward the CFAC and the CSAC, wherein the first Dove prism and the second Dove prism include respective axes that are rotated relative to the first emitter and the second emitter such that the first laser beam and the second laser beam swap fast and slow axes and are stacked in a fast axis direction after passing through the first Dove prism and the second Dove prism.

In some implementations, a method includes emitting, by a first emitter of a diode laser, a first laser beam; emitting, by a second emitter of the diode laser, a second laser beam; collimating, by a FAC, the first laser beam and the second laser beam in a vertical direction relative to a beam propagation direction; rotating, by a first Dove prism, the first laser beam by ninety (90) degrees after the first laser beam passes through the FAC; rotating, by a second Dove prism, the second laser beam by ninety (90) degrees after the second laser beam passes through the FAC; and collimating, by a SAC, the first laser beam and the second laser beam in the vertical direction relative to the beam propagation direction after the first laser beam and the second laser beam are rotated by the first Dove prism and the second Dove prism.

DETAILED DESCRIPTION

The following detailed description of example implementations refers to the accompanying drawings. The same reference numbers in different drawings may identify the same or similar elements.

Figure 1:
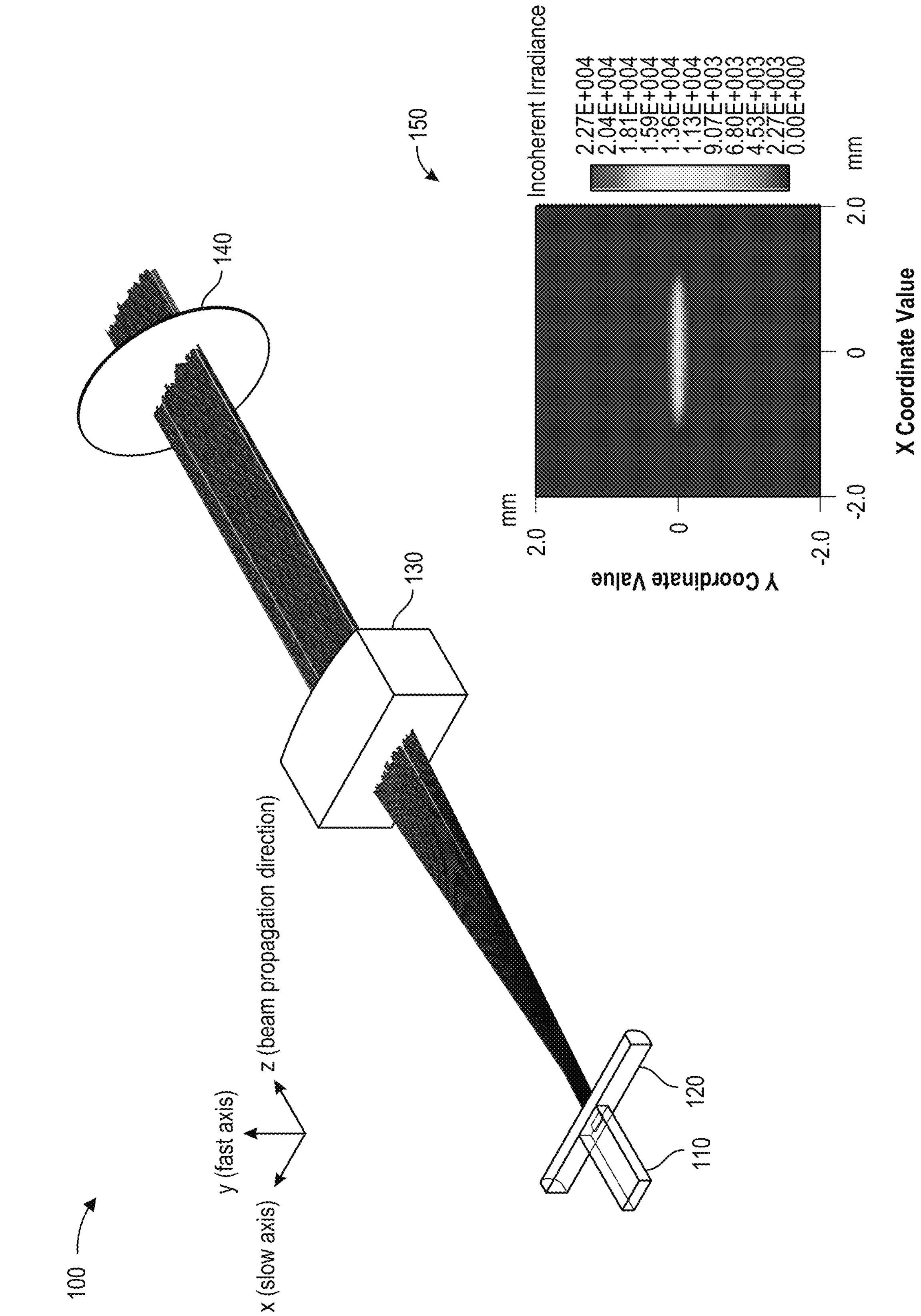
FIG. 1 illustrates an example of an optical system for collimation of a single laser beam.

FIG. 1 illustrates an example 100 of an optical system for collimation of a single laser beam. As shown in FIG. 1, the optical system includes a diode laser with a single emitter configured to emit a laser beam in a beam propagation direction (e.g., corresponding to a z-axis direction in FIG. 1), a fast-axis collimation (FAC) lens arranged to collimate the laser beam in a fast axis direction (e.g., corresponding to ay-axis direction in FIG. 1), a slow axis collimation (SAC) lens arranged to collimate the laser beam in a slow axis direction (e.g., corresponding to an x-axis direction in FIG. 1), and a detector onto which the collimated laser beam propagates. For example, as shown in FIG. 1, reference number 150 depicts an image of the single laser beam on the detector after the laser beam has been collimated using the FAC lens and the SAC lens.

In some cases, the optical system shown in FIG. 1 may be used in a high-power pump module to generate a laser beam that needs to be coupled into a fiber (not shown in FIG. 1). For example, a beam parameter product (BPP) is determined based on a near field times a far field, which is typically a product of an emitter width and a divergence angle for a diode laser, and a BPP of the fiber is typically determined based on the diameter of the core of the fiber and a numerical aperture (NA), or angle, that is essentially equivalent to the far field. For example, in order to couple a laser beam into a fiber, a slow axis BPP ($BPP_{SA}$) needs to be less than or equal to a BPP of the fiber ($BPP_{fiber}$), where $BPP_{SA}$=(EW/2)*($\Theta_{SA}$/2) and $BPP_{fiber}$(D/2)*(NA), where EW is the emitter width, $\Theta_{SA}$ is a slow axis divergence angle of the diode laser, D is the diameter of the core of the fiber, and NA is the NA of the fiber. Accordingly, in order to couple a laser beam into a fiber, the following constraint must be satisfied:

$$BPP_{SA} = \frac{EW}{2} * \frac{\theta_{SA}}{2} \le BPP_{fiber} = \frac{D}{2} * NA$$

Accordingly, in high power fiber coupled diode laser modules for pump applications, the maximal value of the slow axis BPP, $BPP_{SA}$, of a broad area laser (BAL) (e.g., a product of an emitter width and a slow axis divergence angle), is a hard limitation for a power rating of the BAL. For example, the slow axis BPP cannot exceed the BPP of the fiber, because the laser beam would otherwise be coupled into the cladding if the slow axis BPP were to exceed the BPP of the fiber. Furthermore, because the slow axis BPP is a constant after collimation by the SAC lens, either the near-field or the far-field can be controlled, but the product of the near-field times the far-field cannot be changed, whereby the slow axis BPP is a hard limitation on whether the laser beam can be coupled into a fiber. For example, to achieve a design goal of making a diode laser that has a power rating as high as possible, a very large emitter width may be used, but the large emitter width would significantly increase the slow axis BPP (e.g., because the emitter width is in the numerator of the slow axis BPP calculation) such that the laser beam cannot be coupled into the fiber (e.g., because the increase in emitter width would cause the slow axis BPP to exceed the BPP of the fiber). However, a fast axis beam parameter product ($BPP_{FA}$) of the BAL is typically much smaller than the slow axis beam parameter product (e.g., $BPP_{SA}$>>$BPP_{FA}$). For example, in the optical system shown in FIG. 1, the slow axis is in a lateral direction, whereas the BAL is a single mode laser that has a much smaller BPP in a vertical (y-axis) direction. Accordingly, to increase the power of the optical module, additional laser beams may be stacked in the fast axis direction since the fast axis has a much smaller BPP than the slow axis. For example, using a laser chip with two emitters rather than one emitter and manipulating two laser beams independently can theoretically double a chip power rating while maintaining the same $BPP_{SA}$ for only one of the two emitters. A beam transformation system (BTS) can do the work for multi-emitter laser bars or minibars, but a BTS tends to be expensive and hard to align. Although two folding mirrors for 90° beam rotation may be less expensive than a BTS, two folding mirrors have similar problems related to optical manipulation accuracy. Furthermore, adding more laser diodes would be unsuitable to achieve power scaling, because each laser diode would need an additional set of supporting components (e.g., an additional FAC, SAC, and/or folding mirror), which would make the optical module larger and more expensive.

In some implementations, as described herein, two relatively inexpensive Dove prisms may be used to accomplish laser beam manipulation. For example, in some implementations, an optical module may include a diode laser that includes a first emitter configured to emit a first laser beam in a beam propagation direction and a second emitter configured to emit a second laser beam in the beam propagation direction, a FAC arranged to collimate the first laser beam and the second laser beam in a vertical direction relative to the beam propagation direction, a SAC arranged after the FAC to collimate the first laser beam and the second laser beam in a horizontal direction relative to the beam propagation direction, a first Dove prism arranged between the FAC and the SAC, and a second Dove prism arranged between the FAC and the SAC. In some implementations, the first Dove prism and the second Dove prism include respective axes that are rotated relative to the first emitter and the second emitter such that the first laser beam and the second laser beam swap fast and slow axes and are stacked in a fast axis direction after passing through the first Dove prism and the second Dove prism. Accordingly, the two Dove prisms each rotate one laser beam by 90° independently when the Dove prism rotates 45° (e.g., the two Dove prisms independently rotate two respective laser beams by 90°), whereby the two laser beams swap fast axis and slow axis directions after passing through the two Dove prisms and the laser beams stack horizontally (e.g., in the fast axis direction after the laser beams are rotated by the two Dove prisms). As a result, the $BPP_{SA}$, which is in the vertical direction after rotation by the two Dove prisms, is equal to the $BPP_{SA}$ of one of the two emitters, or only half the $BPP_{SA}$ of the two emitters combined, which increases the power of the optical module and allows the two laser beams to satisfy the criteria for coupling into a fiber.

Figure 2A:
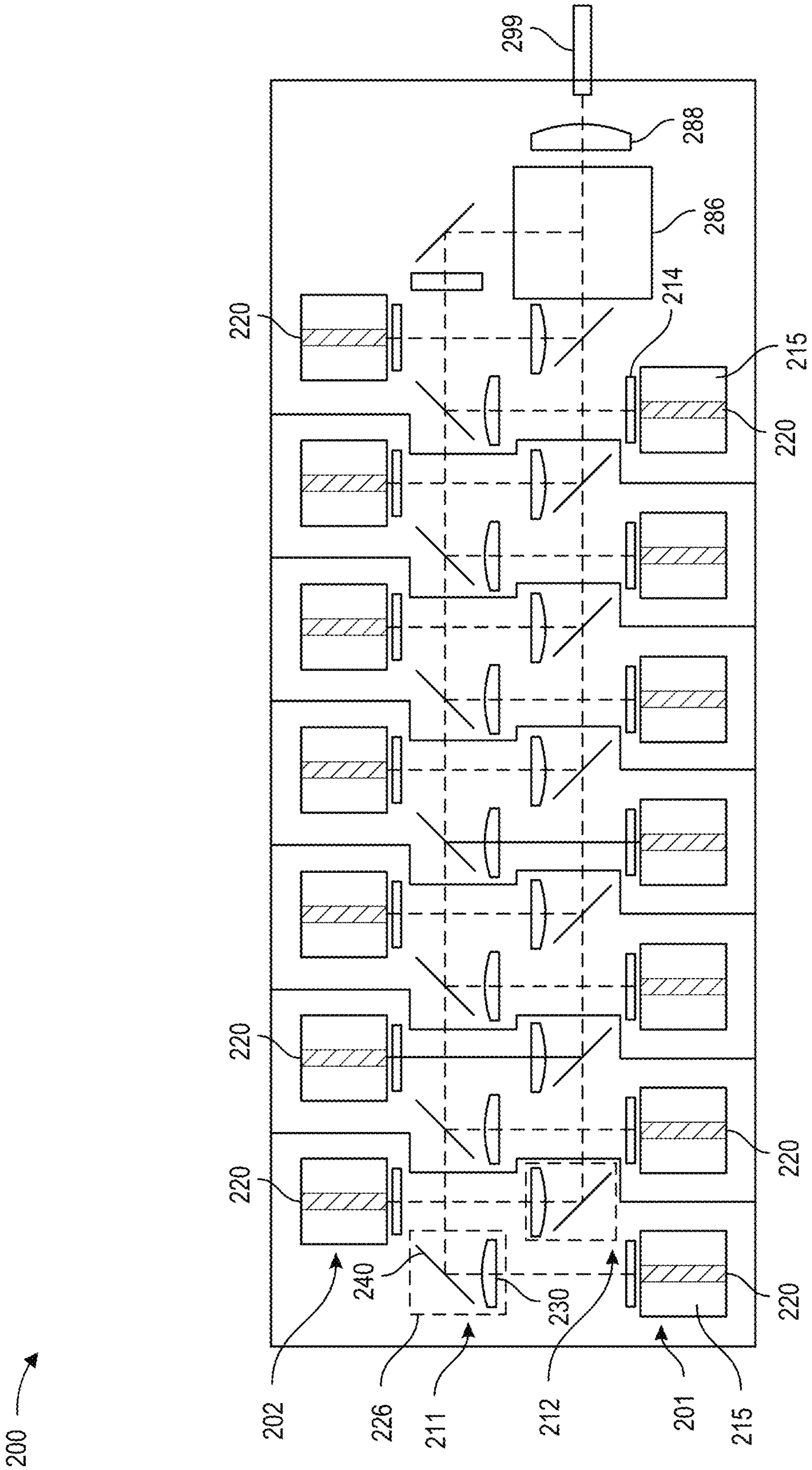
FIG. 2A illustrates an example of a multi-chip package structure.
Figure 2B:
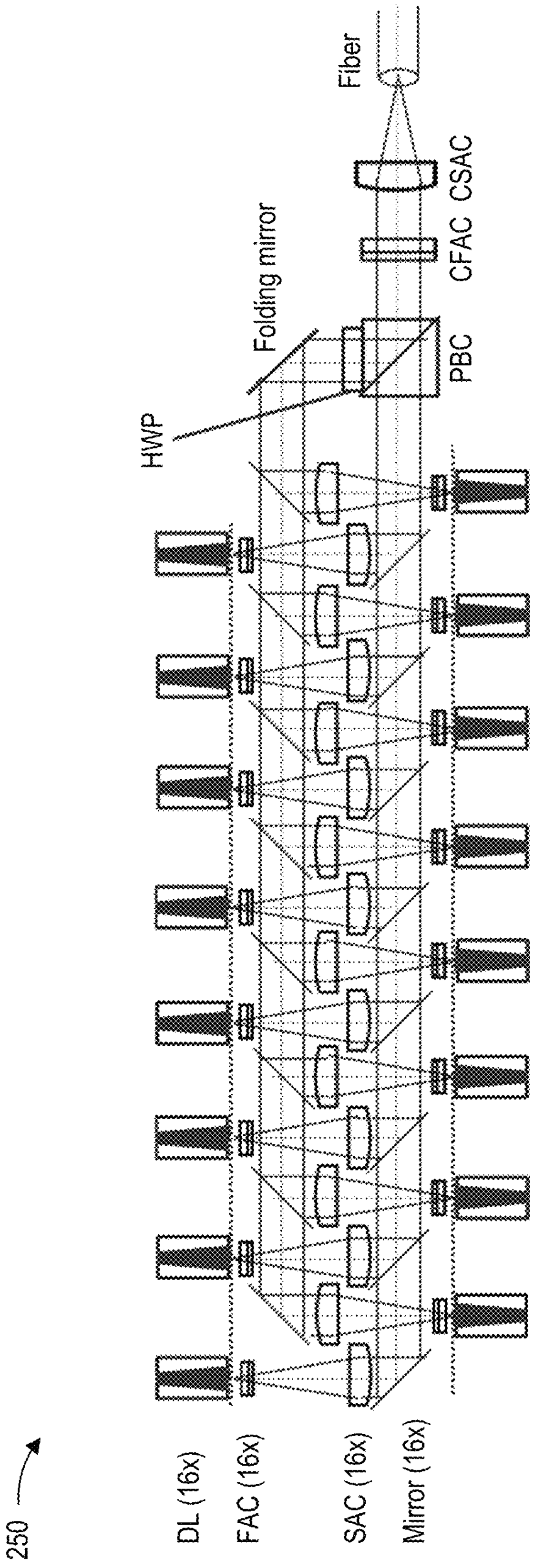
FIG. 2B illustrates an example of an optical layout for a pump module based on the multi-chip package structure illustrated in FIG. 2A.
Figure 2B:
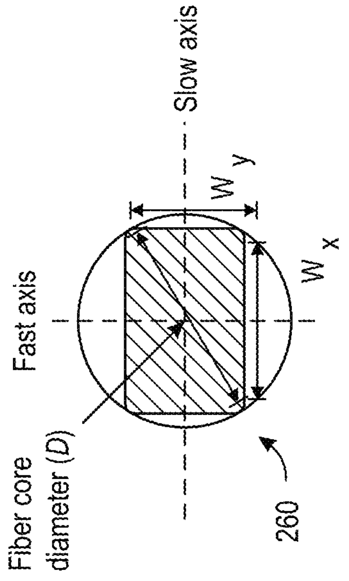

FIG. 2A illustrates an example 200 of a multi-chip package structure, and FIG. 2B illustrates an example 250 of an optical layout for a pump module based on the multi-chip package structure illustrated in FIG. 2A.

As shown in FIG. 2A, the multi-chip package structure may include an emitter array with fourteen (14) emitters 220 arranged in two opposing, offset banks 201, 202. In some implementations, the two offset banks 201, 202 may be mounted upon a stepped surface with mounting pads (or submounts) 215 that provide electrical contact to the emitters 220 and thermal contact between the emitters 220 and a support base. Each set of seven emitters 220 is staggered in height from highest to lowest, from left to right. The seven beams from each chip bank 201, 202 pass through respective FACs 214 that collimate the beams in planes of their respective fast axes, and the seven beams cross the opposing beams and reflect off 45° turning mirrors 240 that stack the seven beams (not shown) atop one another. For example, the multi-chip package structure 200 includes two rows 211 and 212 of beam collimating reflectors (BCRs) 226 that are coupled to and optically aligned with a respective emitter 220, where each BCR 226 includes a SAC 230 followed by a turning mirror 240. The two sets of stacked beams are combined at a polarization beam combiner (PBC) 286 (e.g., to double the brightness) and focused into an output fiber 299 using a coupling optic 288 (e.g., a coupling lens).

Referring now to FIG. 2B, example 250 depicts an optical layout for a pump module based on the multi-chip package structure illustrated in FIG. 2A. For example, as shown, the pump module includes multiple diode lasers arranged in an array with two offset banks, where each diode laser is associated with one FAC, one SAC, and one turning mirror (e.g., each set of one diode laser, one FAC, and one SAC may be arranged in the manner as shown in FIG. 1). For example, in FIG. 2B, the pump module includes 16 diode lasers, 16 FACs, 16 SACs, and 16 mirrors, which create two sets of eight beams that are stacked and combined using a folding mirror, a half-wave plate (HWP), and a PBC. The beams may then be focused into an output fiber using a coupling FAC (CFAC) and a coupling SAC (CSAC). For example, FIG. 2B illustrates a slow axis ray trace in a top view, where the various beams emitted by the diode lasers are each collimated by a respective FAC and a respective SAC before reflecting off a respective mirror and being coupled into the fiber.

As further shown in FIG. 2B, reference number 260 depicts a spot diagram of beams on a tip of the fiber, where the spot diagram corresponds to eight beams that are emitted by eight diode lasers that are stacked in a fast axis direction (e.g., the diode lasers in one bank). As shown by reference number 260, even after the beams emitted by the eight diode lasers are stacked in the fast axis direction, the spot diagram is not a perfect square, whereby the overall $BPP_{FA}$ is still smaller than the $BPP_{SA}$ of one laser diode. In this case, to couple n beams into the fiber, where n is an integer greater than one (1), the following condition needs to be satisfied:

$$(BPP_{SA})^2+(BPP_{nFA})^2\leq(BPP_{fiber})^2$$

where a value of $BPP_{nFA}$ is approximately equal to $n/\gamma{*}BPP_{FA}$, where $\gamma$ is a fill factor of the beam stacking (e.g., a measure of the stacked beams filling the area of the fiber core, where a worse or lower value for the fill factor reduces the number of lasers that can be stacked and coupled into the fiber). As described above, one diode laser may generally be coupled into a fiber in cases where the slow axis BPP is less than the BPP of the fiber. However, in cases where multiple diode lasers are stacked in the fast axis direction, the total fast axis BPP increases, and the squares of the $BPP_{SA}$ and the $BPP_{nFA}$ need to satisfy the above condition.

As indicated above, FIGS. 2A-2B are provided as an example. Other examples may differ from what is described with regard to FIGS. 2A-2B. The number and arrangement of devices shown in FIGS. 2A-2B are provided as an example. In practice, there may be additional devices, fewer devices, different devices, or differently arranged devices than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) shown in FIGS. 2A-2B may perform one or more functions described as being performed by another set of devices shown in FIGS. 2A-2B.

Figure 3:
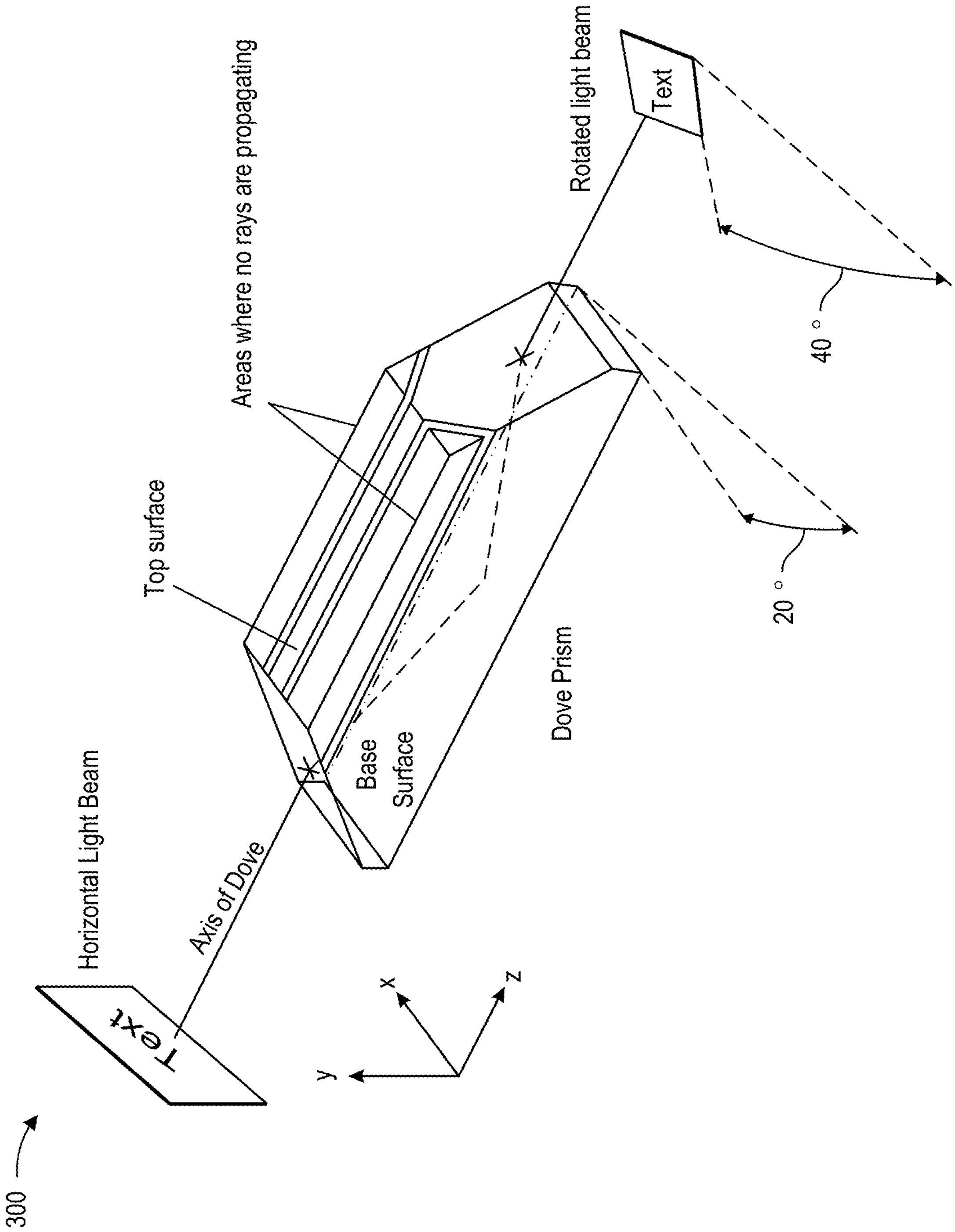
FIG. 3 illustrates an example of a Dove prism.

FIG. 3 illustrates an example 300 of a Dove prism, which is a prism that can be used to rotate a laser beam. For example, the Dove prism may be shaped from a truncated right-angle prism and has two sloped faces (e.g., two tilted planes at a base angle between a top surface and a bottom surface), where a light beam that travels parallel to a longitudinal axis of the Dove prism and enters one of the sloped faces of the Dove prism experiences total internal reflection from the inside of the longest (bottom) surface and emerges from the opposite sloped face. Accordingly, a beam that passes through the Dove prism is rotated.

Rotating the Dove prism about the longitudinal axis rotates the image at twice the rate of the rotation of the Dove prism (e.g., a 20° rotation of the Dove prism results in a 40° rotated image). Due to the high incidence angle, the light reflecting from the bottom face undergoes total internal reflection, even if the propagation axis of the light and the longitudinal axis of the Dove prism are not exactly parallel. Accordingly, in a Dove prism, the magnitude of the internal transmission is limited only by absorption.

Accordingly, some implementations described herein may use a Dove prism to rotate a light beam (or laser beam) that an emitter generates in a beam propagation direction, which may enable two emitters to be used in a diode laser because the Dove prism causes fast and slow axes of the laser beam to be swapped. For example, as described herein, a Dove prism generally rotates a light beam by $2\theta$ when a base of the Dove prism is rotated by $\theta$ relative to a beam propagation direction. Accordingly, because some implementations described herein relate to an optical module with dual emitters that generate two respective laser beams that are independently rotated by 90° such that the slow axis and the fast axis swap directions (e.g., the slow axis becomes the fast axis, and vice versa), two Dove prisms may be used in combination with the dual emitters, and each Dove prism may be rotated by 45° relative to a respective emitter so that each Dove prism rotates a laser beam by 90° (e.g., $\theta$=45° to achieve a rotation of $2\theta$=90°. Furthermore, because a light beam that propagates along the axis of the Dove prism bends toward the base surface and reflects within the Dove prism, there are no rays propagating in areas of the Dove prism near the two long edges of the top surface. Accordingly, in some implementations, two edges of the two Dove prisms may be cut to enable use in an optical module with dual emitters (e.g., the two edge cuts do not have any effect on the optical properties of the Dove prisms because there are no light rays propagating in the areas that are cut). For example, each Dove prism may have a first edge cut to enable the two Dove prisms to be arranged more closely (e.g., allowing the two emitters to be positioned close to one another, which reduces a size and/or a cost of the optical module). Further, each Dove prism may have a second edge cut to enable the two Dove prisms to be surface mounted within the optical module.

As indicated above, FIG. 3 is provided as an example. Other examples may differ from what is described with regard to FIG. 3.

Figure 4A:
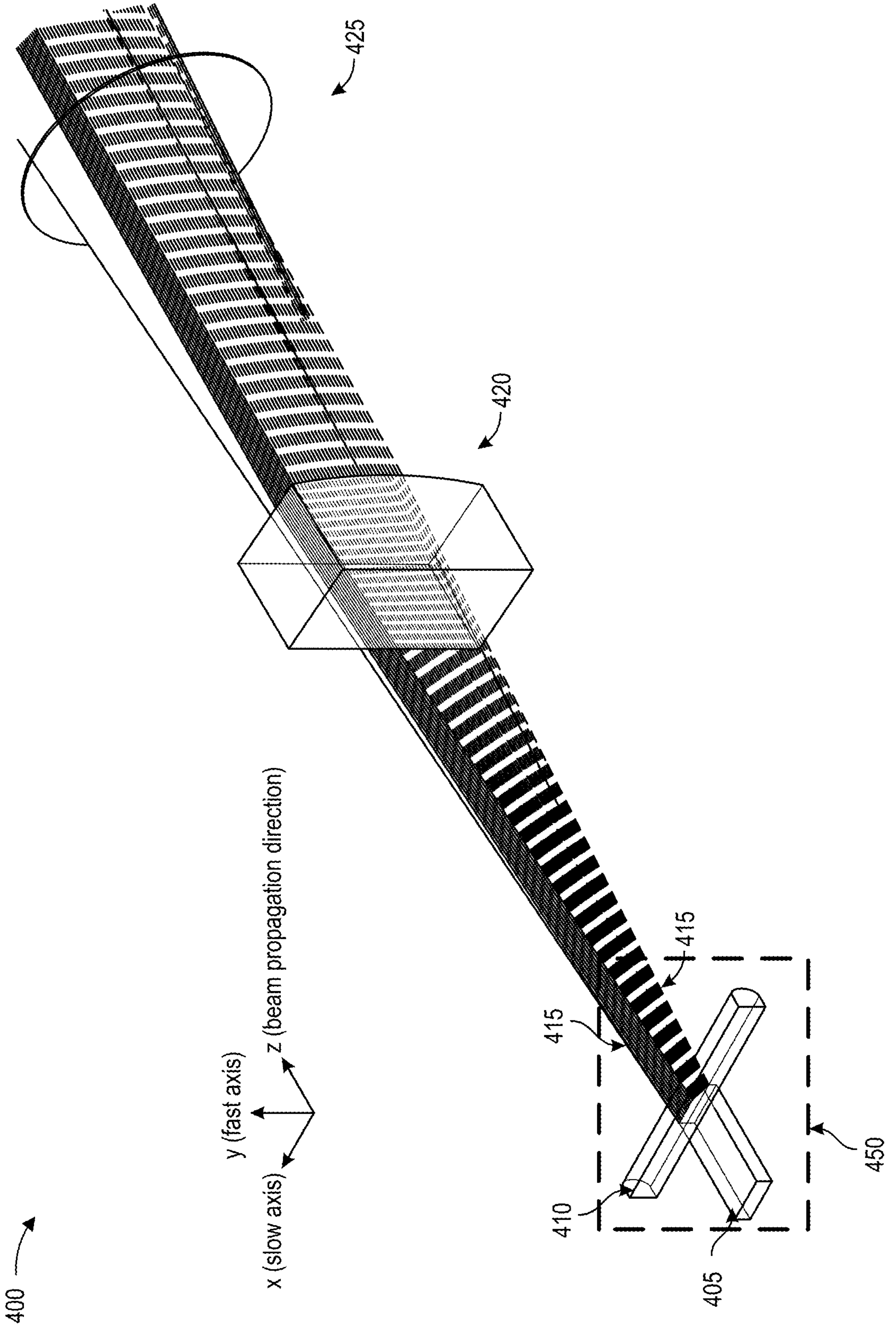
FIGS. 4A-4C illustrate an example implementation of an optical module with double emitters and double Dove prisms described herein.
Figure 4B:
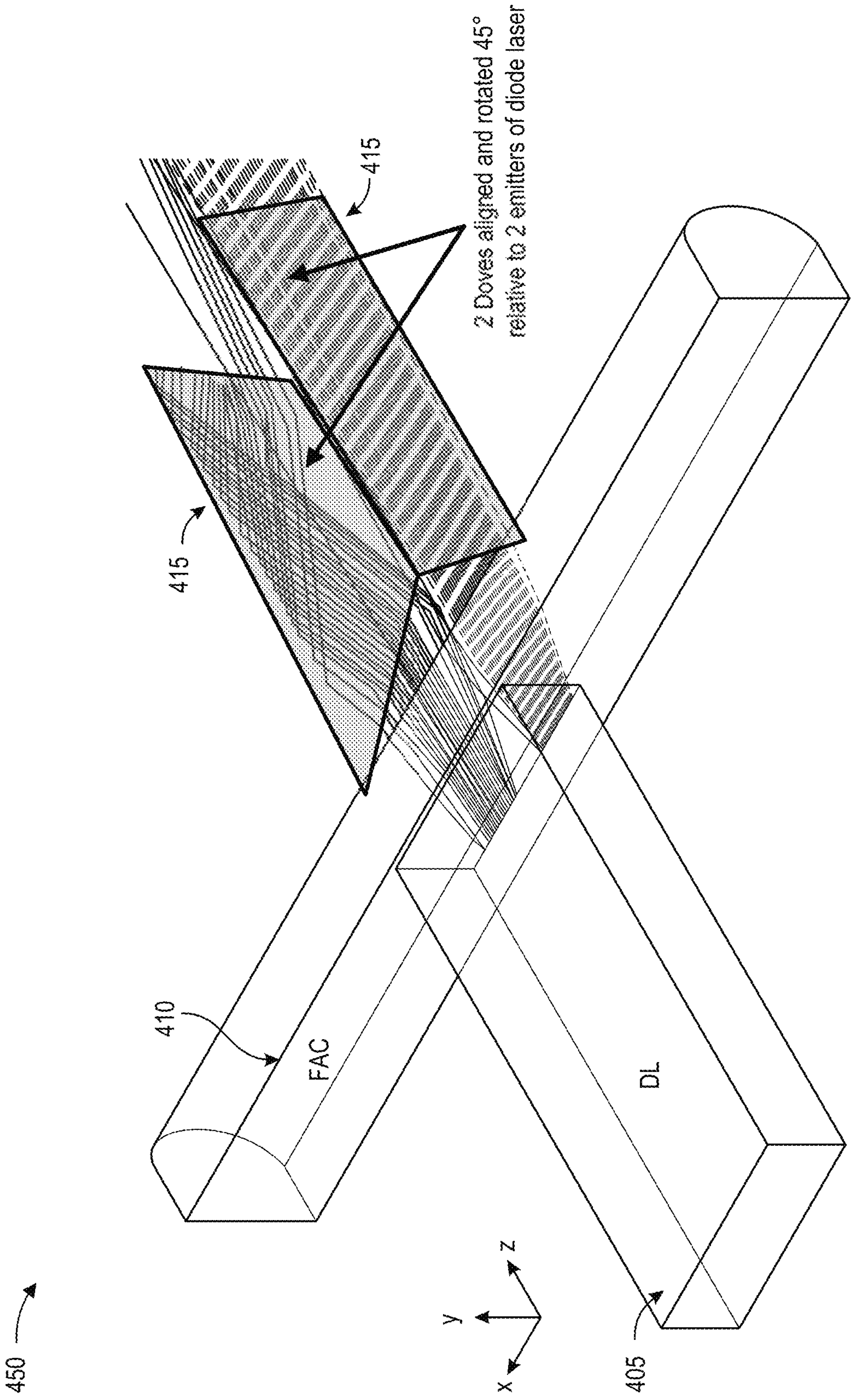
Figure 4C:
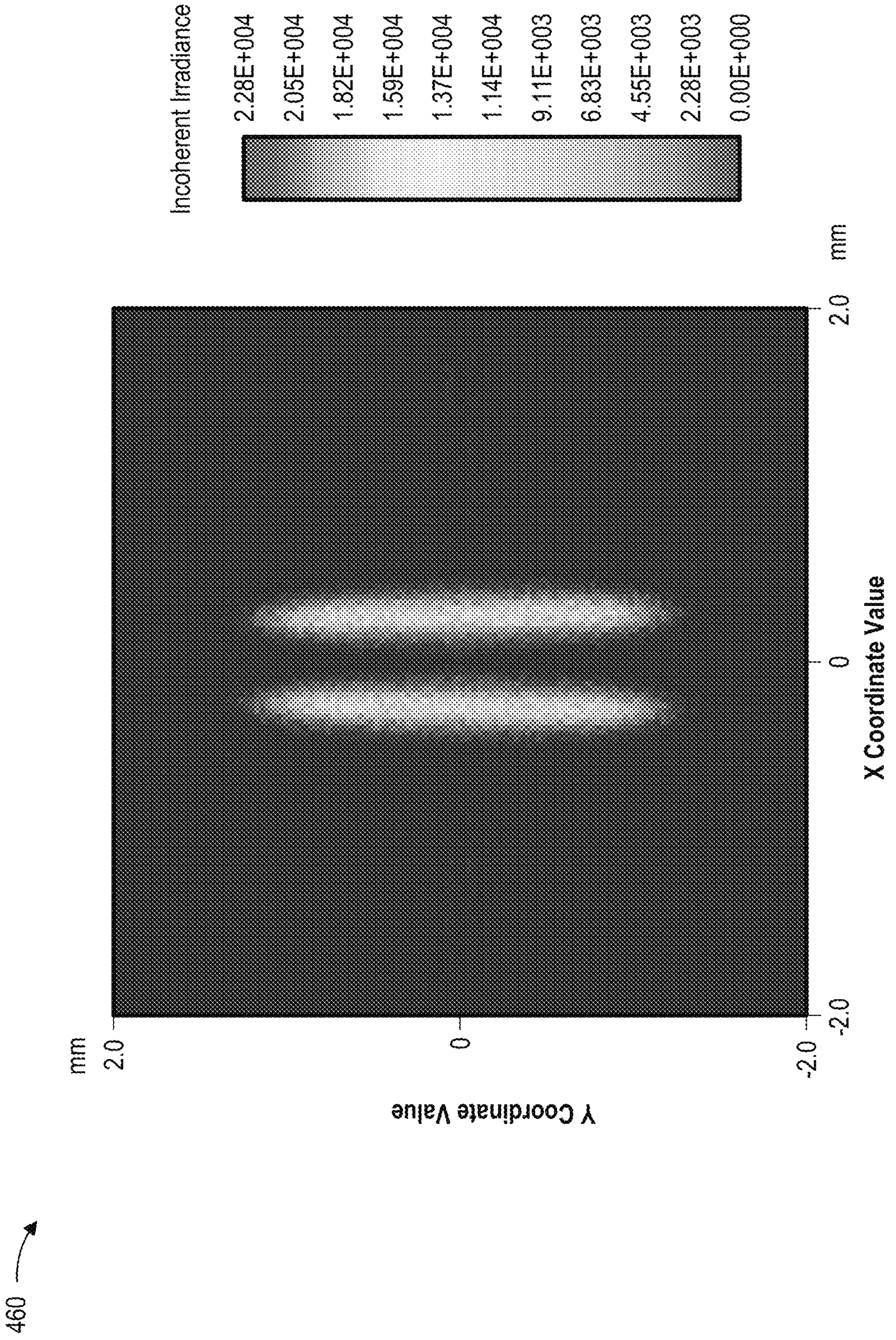

FIGS. 4A-4C illustrate an example implementation 400 of an optical module with double emitters and double Dove prisms described herein. As shown in FIG. 4A, the optical module may include a diode laser 405 with two emitters (e.g., a dual-emitter diode laser) configured to emit respective laser beams, a FAC lens 410, two Dove prisms 415, a SAC lens 420, and a detector 425 onto which the two collimated beams propagate. Furthermore, FIG. 4B illustrates a zoomed-in view of the lower bottom inlet in FIG. 4A (the enclosed area denoted by reference number 450). In particular, FIG. 4B illustrates a zoomed-in view of the enclosed area denoted by reference number 450, which includes the dual-emitter diode laser 405, the FAC lens 410, and the two Dove prisms 415 that are properly aligned and rotated 45° relative to the two laser emitters of the diode laser 405, respectively. In FIG. 4A and FIG. 4B, the optical components (e.g., the diode laser 405, FAC lens 410, Dove prisms 415, and/or SAC lens 420) are shown in outline so that the laser beam propagations can be easily seen. FIG. 4C illustrates an example 460 of the two collimated laser beams striking onto the detector, after the laser beams have passed through the FAC lens 410, the double Dove prisms 415, and the SAC lens 420 and rotated 90° relative to the directions that the laser beams are emitted by the emitters of the diode laser 405.

In a typical configuration, the horizontal lateral direction (e.g., the x-axis direction in FIGS. 4A-4B) is the slow axis direction, and the vertical direction (e.g., the y-axis direction in FIGS. 4A-4B) is the fast axis direction. For example, referring to FIGS. 4A-4B, the diode laser includes two emitters, including a first emitter and a second emitter that emit respective laser beams in a beam propagation direction (e.g., the z-axis direction in FIGS. 4A-4B). Accordingly, when the laser beams are emitted by the two emitters, the horizontal lateral direction is the slow axis direction and the vertical direction is the fast axis direction, and these orientations are maintained after the two laser beams pass through the FAC lens 410 that is arranged to collimate the two laser beams in the vertical direction relative to the beam propagation direction. However, prior to the two laser beams arriving at the SAC lens 420, the two Dove prisms 415 independently rotate the two laser beams by 90° such that the slow axis becomes the fast axis and the fast axis becomes the slow axis. For example, the spot diagram in FIG. 4C illustrates the 90° beam rotation (e.g., compared to the spot diagram shown by reference number 150 in FIG. 1), which occurs because the Dove prisms 415 include respective axes that are rotated by 45° relative to the two emitters such that the two laser beams swap fast and slow axes and are stacked in the fast axis direction after passing through the Dove prisms 415.

In particular, as described herein, the fast axis direction is horizontal relative to the beam propagation direction and the slow axis direction is vertical relative to the beam propagation direction after the two laser beams pass through the pair of Dove prisms 415. In this way, by swapping the fast and slow axes, multiple (e.g., two) laser beams can be easily stacked in the fast axis direction and coupled into a fiber while satisfying the coupling constraints described in further detail above (e.g., avoiding problems with conventional configurations, where the emitter width is too wide to couple two beams into the fiber). Furthermore, in this way, half the number of diode lasers 405 are able to stack the same number of beams in the fast axis as a conventional design (e.g., eight diode lasers that each include two emitters can be used to generate 16 beams that are stacked in the fast axis, whereas conventional designs would need to use 16 diode lasers, which significantly reduces the cost per amp because each diode laser 405 only needs one FAC lens 410, one SAC lens 420, and one submount).

As indicated above, FIGS. 4A-4C are provided as an example. Other examples may differ from what is described with regard to FIGS. 4A-4C. The number and arrangement of devices shown in FIGS. 4A-4C are provided as an example. In practice, there may be additional devices, fewer devices, different devices, or differently arranged devices than those shown in FIGS. 4A-4C. Furthermore, two or more devices shown in FIGS. 4A-4C may be implemented within a single device, or a single device shown in FIGS. 4A-4C may be implemented as multiple, distributed devices. Additionally, or alternatively, a set of devices (e.g., one or more devices) shown in FIGS. 2A-2B may perform one or more functions described as being performed by another set of devices shown in FIGS. 4A-4C.

Figure 5:
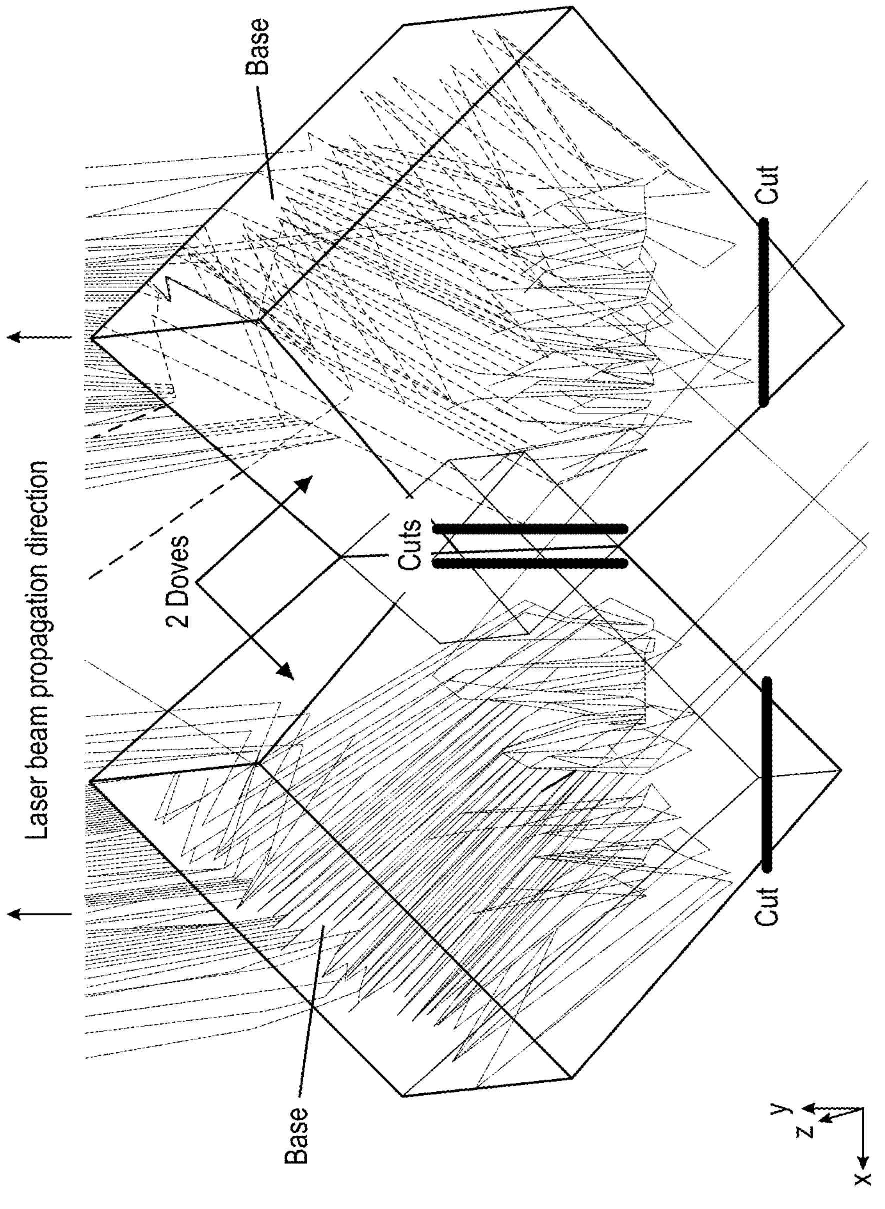
FIG. 5 illustrates an example design for double Dove prisms that may be used in an optical module described herein.

FIG. 5 illustrates an example 500 of a design for double Dove prisms that may be used in an optical module described herein. As shown in FIG. 5, two Dove prisms may be rotated such that respective bases of the two Dove prisms are as shown (e.g., the two Dove prisms may each be rotated 45° relative to an emitter included in a dual-emitter diode laser). For example, FIG. 5 illustrates a front, outline view of two laser beams that are propagating through the two Dove prisms. In FIG. 5, both the diode laser and the FAC lens are not shown, for clarity. As shown in FIG. 5, there are two laser ray propagation paths in the two Dove prisms, which allows four edge cuts to be made. For example, as described above, all of the laser rays in a Dove prism bend toward the base of the Dove prism when the laser rays propagate along an axis of the Dove prism, whereby there is no light propagating near a top surface of the Dove prism.

Accordingly, as shown in FIG. 5, the two long edges of the top surface of each Dove prism can be cut (totaling four edge cuts). For example, a first corner of each Dove prism may be cut (shown by the thick vertical lines in FIG. 5) to allow the two Dove prisms to be positioned close to one another, which may allow the two emitters of the diode laser to be packed closer together and thereby enhance the fill factor of the stacked beams. Furthermore, a second corner of each Dove prism may be cut (shown by the thick horizontal lines in FIG. 5) to allow the two Dove prisms to be surface mounted within the optical module. Accordingly, after the two edges of each Dove prism have been cut, one pair of cut surfaces can be used to bring the two Dove prisms closer together to reduce the distance between the two laser beams, and the other cut surfaces can be used for surface mounting. Using a fiber coupling power drop of about 5% as a failure criterion, the two Dove prisms may need an alignment accuracy of ±20 micrometers (μm) in a horizontal (e.g., x-axis) direction, ±30 μm in a vertical (e.g., y-axis) direction, and ±0.5° rotation relative to the centers and the original 45° positions of the two individual emitters in the diode laser (e.g., to ensure that the center of each Dove prism is horizontally, vertically, and rotationally aligned with a center of a corresponding emitter in the diode laser). For example, in some implementations, the locations of the cuts that are made in each Dove prism may be chosen to ensure that a distance between the respective centers of the Dove prisms is the same as the distance between the two emitters of the diode laser. Furthermore, it will be appreciated that the horizontal, vertical, and/or rotational alignment tolerances may vary depending on the value of the power drop that is used as the failure criterion (e.g., more misalignment may be tolerated if a power drop value greater than 5% is used as the failure criterion, or the misalignment tolerance may be stricter if a power drop value less than 5% is used as the failure criterion).

As indicated above, FIG. 5 is provided as an example. Other examples may differ from what is described with regard to FIG. 5.

Figure 6:
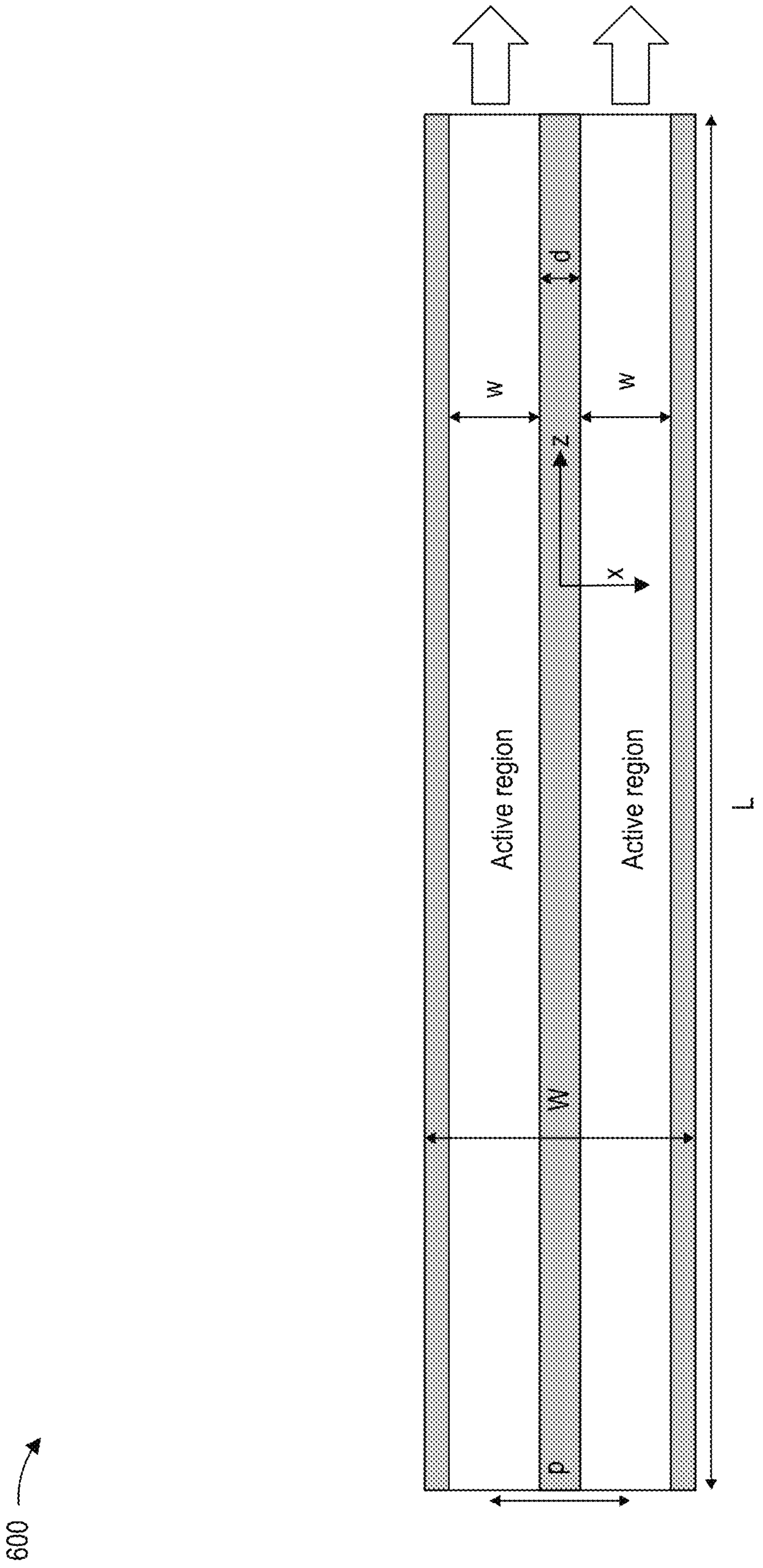
FIG. 6 illustrates an example design for a laser chip with double emitters that may be used in an optical module described herein.

FIG. 6 illustrates an example 600 of a design for a laser chip with double emitters that may be used in an optical module described herein. For example, FIG. 6 depicts a top view of the laser chip, where the two outer gray shaded regions are an outline of the laser chip, the active regions each correspond to one laser emitter, and the middle gray shaded region is a trench or other suitable structure separating the two laser emitters to enable the two laser emitters to operate independently. As shown in FIG. 6, light propagates in each active region and is emitted on the right-hand side. Accordingly, as described above with reference to FIGS. 4A-4C and FIG. 5, the two laser beams then pass through a single FAC lens, and each laser beam then passes through a respective Dove prism that rotates the respective laser beam by 90° such that the two laser beams are stacked in the fast axis. The two laser beams, after being rotated 90° and stacked in the fast axis, then pass through a SAC and one or more optics that couple the two laser beams into an optical fiber. Furthermore, in context with FIGS. 2A-2B, the laser chip shown in FIG. 6 is an example of a diode laser depicted therein, except that the laser chip (or diode laser) includes two emitters, and two Dove prisms aligned with the two emitters of the diode laser are positioned between each pair of a FAC and a SAC.

In some implementations, as described herein, the laser chip may include various design parameters that can increase the power rating of the laser chip relative to a single emitter design, in addition to reducing thermal resistance relative to a single emitter design. For example, in addition to generating light, each active region also generates heat that needs to be dissipated. Accordingly, in order to ensure that the diode laser has the same or better efficiency than a single emitter design, the various design parameters of the laser chip may be selected to maintain the same temperature. For example, as shown in FIG. 6, the design parameters that may be modified to increase the power rating of the laser chip include a cavity length L, a chip width W a pitch p that represents a distance between the centers of the two emitters (and a distance between the two Dove prisms), an emitter width w for each respective emitter, and a distance d between the two active regions (e.g., a width of the trench or other structure separating the two active regions). Furthermore, because the trench or other structure separating the two active regions allows the two emitters to work independently, the laser chip may continue to function as a single emitter in cases where one of the dual emitters malfunctions or otherwise fails.

For example, in one design, the laser chip may have a power rating of 40 watts (W) based on a design that includes double emitters at a power rating of 20 W each, a cavity length L of 5500 μm, and a chip width W of 650 μm. Furthermore, in the 40 W (e.g., 20 W×2) design, each of the dual emitters has an emitter width w of 200 μm and the distance d between the two emitters is 100 μm, which results in the pitch p having a value of 300 μm. In the 40 W design, the slow axis divergence is 9.5° based on a ~95% enveloped power at 20 W per emitter (e.g., the SA divergence may be 8.9° based on a ~90% enveloped power at 20 W per emitter, resulting in a worst case of at least 9°). Furthermore, a fast axis divergence may be 62° based on a ~97% ($1/e^2$) enveloped power, the $BPP_{SA}$ per emitter is 200 μm×9° or approximately 7.86 millimeters times milliradians (mm-mrad), the $BP_{FA}$ per emitter is $M^2 \times \lambda_0/\pi$(1.07×0.920 μm/3.14) or approximately 0.314 mm-mrad, and a fast axis refractive index per emitter is given by $BPP_{FA}$/62°×229 μm, or 1.18 μm. In this way, the dual emitters allow the laser chip to reach approximately twice the power rating per chip compared to a single-emitter design. Furthermore, in the 40 W design, the chip width W may be less than a width of solder pads used for submount in a single-emitter design (e.g., the submounts 215 shown in FIG. 2A, which may have a width of 700 μm), whereby the solder pads of the existing submount may be used.

In another example design, the power rating of the laser chip may be increased by varying one or more design parameters of the laser chip. For example, a power rating of 50 W may be achieved by using a chip width W of 800 μm, an emitter width w of 230 μm, and a distance d between the two emitters of 170 μm, which results in the pitch p being 400 μm (e.g., because w+d=p). In the 50 W (25 W×2) design, the slow axis divergence, the fast axis divergence, the BPPFA, and the fast axis refractive index may be similar to the 40 W design, and the $BPP_{SA}$ per emitter is 230 μm×9° or approximately 9.04 mm-mrad. Alternatively, the power rating of the laser chip may be increased to 60 W (30 W×2) by increasing the emitter width w to 250 μm and reducing the distance d between the two emitters to 150 μm, which results in a $BPP_{SA}$ per emitter of 250 μm×9° or approximately 9.83 mm-mrad. Accordingly, because the $BPP_{SA}$ generally increases as the power rating of the laser chip increases, but the $BPP_{FA}$ remains relatively constant, using a pair of Dove prisms that are aligned with the respective centers of the two emitters to rotate the two laser beams by 90° and stack the laser beams in the fast axis direction allows the two laser beams to be more easily coupled into an optical fiber (e.g., because the fast and slow axes are swapped after the laser beams pass through the Dove prisms). In these examples, the chip width W may exceed the width of the solder pads used for a single-emitter submount, whereby the solder pads of the existing submount may be widened to accommodate the larger chip width W.

As indicated above, FIG. 6 is provided as an example. Other examples may differ from what is described with regard to FIG. 6.

Figure 7A:
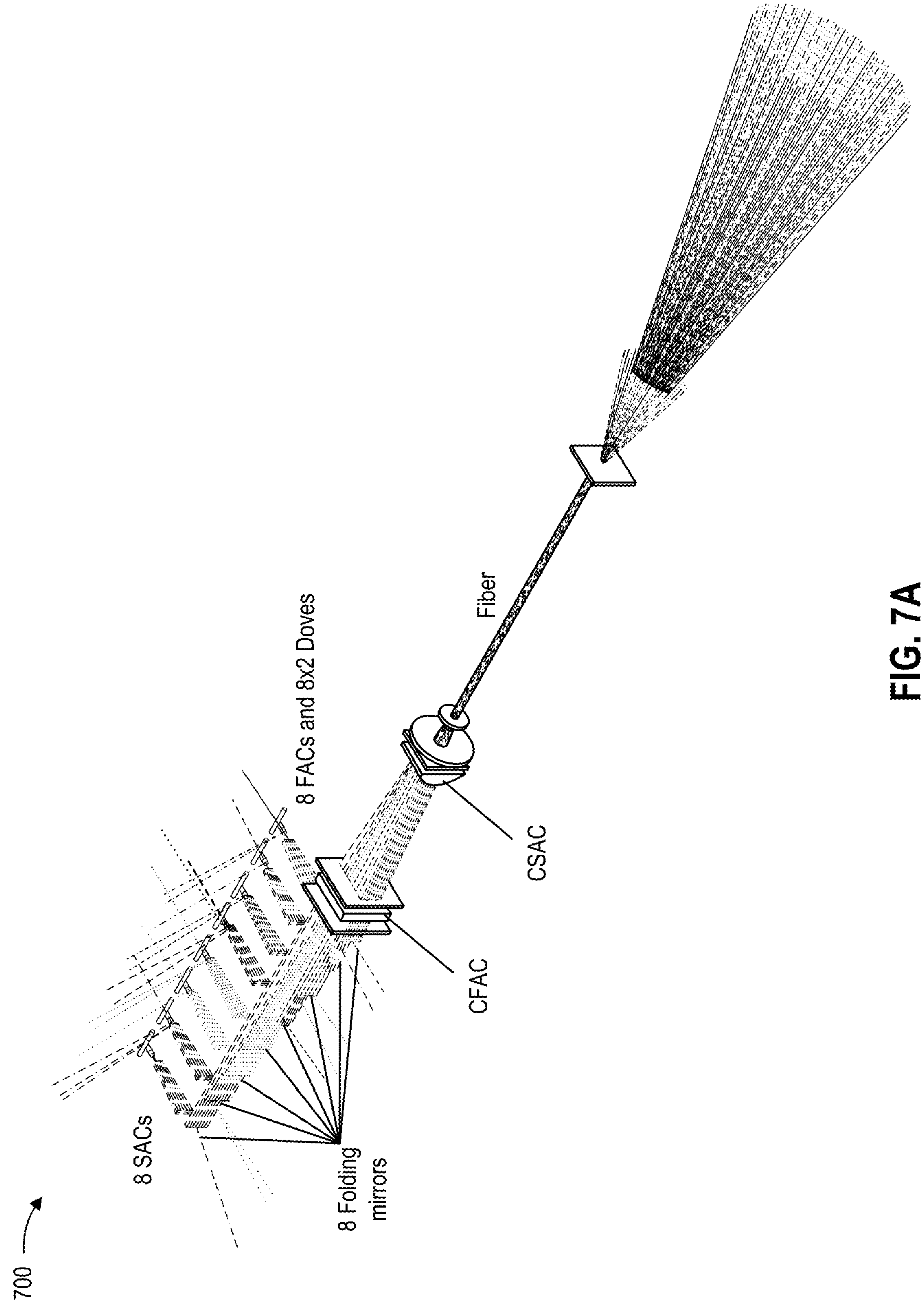
FIGS. 7A-7C illustrate an example implementation of an optical assembly that includes an array of optical modules with double emitters and double Dove prisms described herein.
Figure 7B:
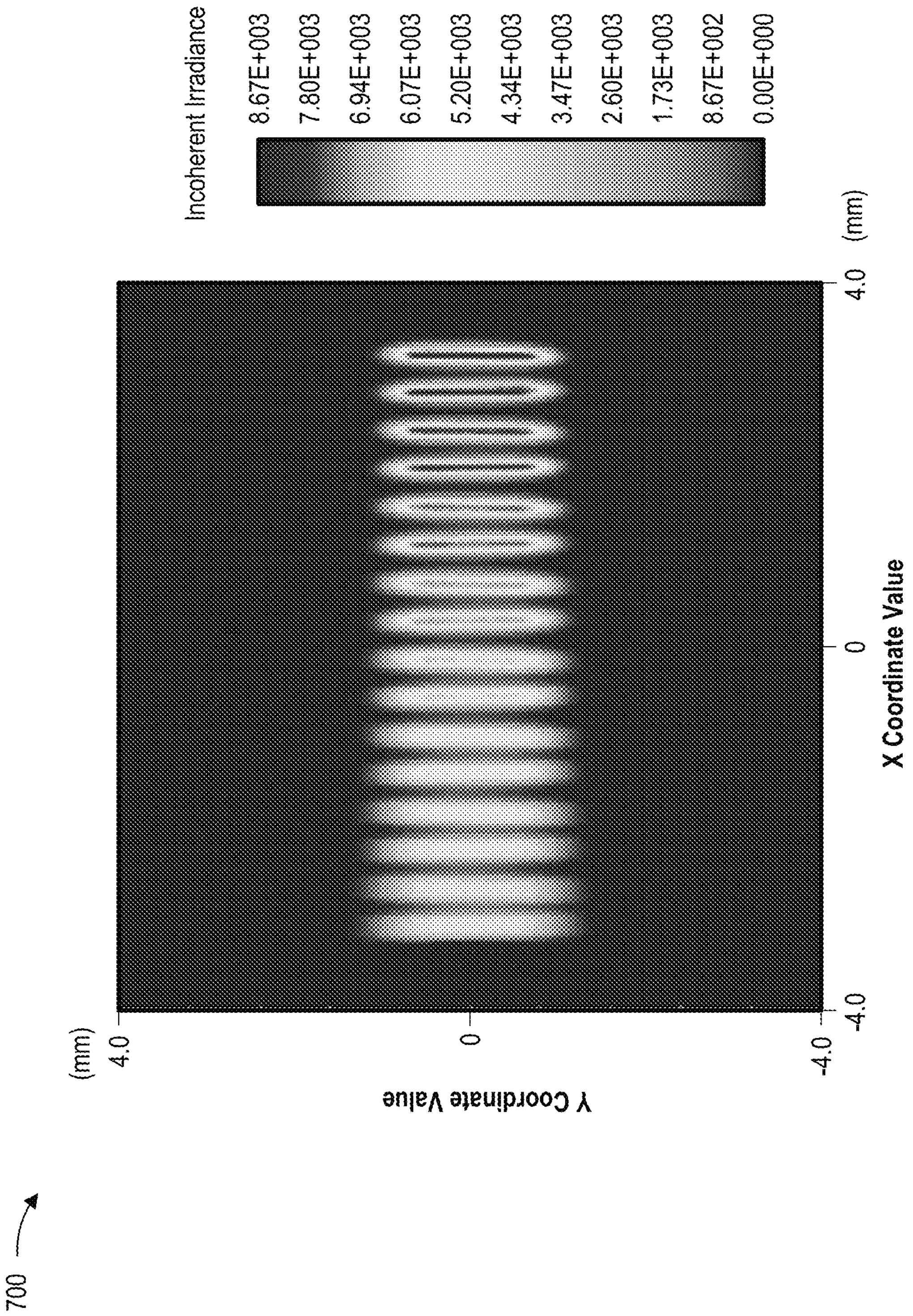
Figure 7C:
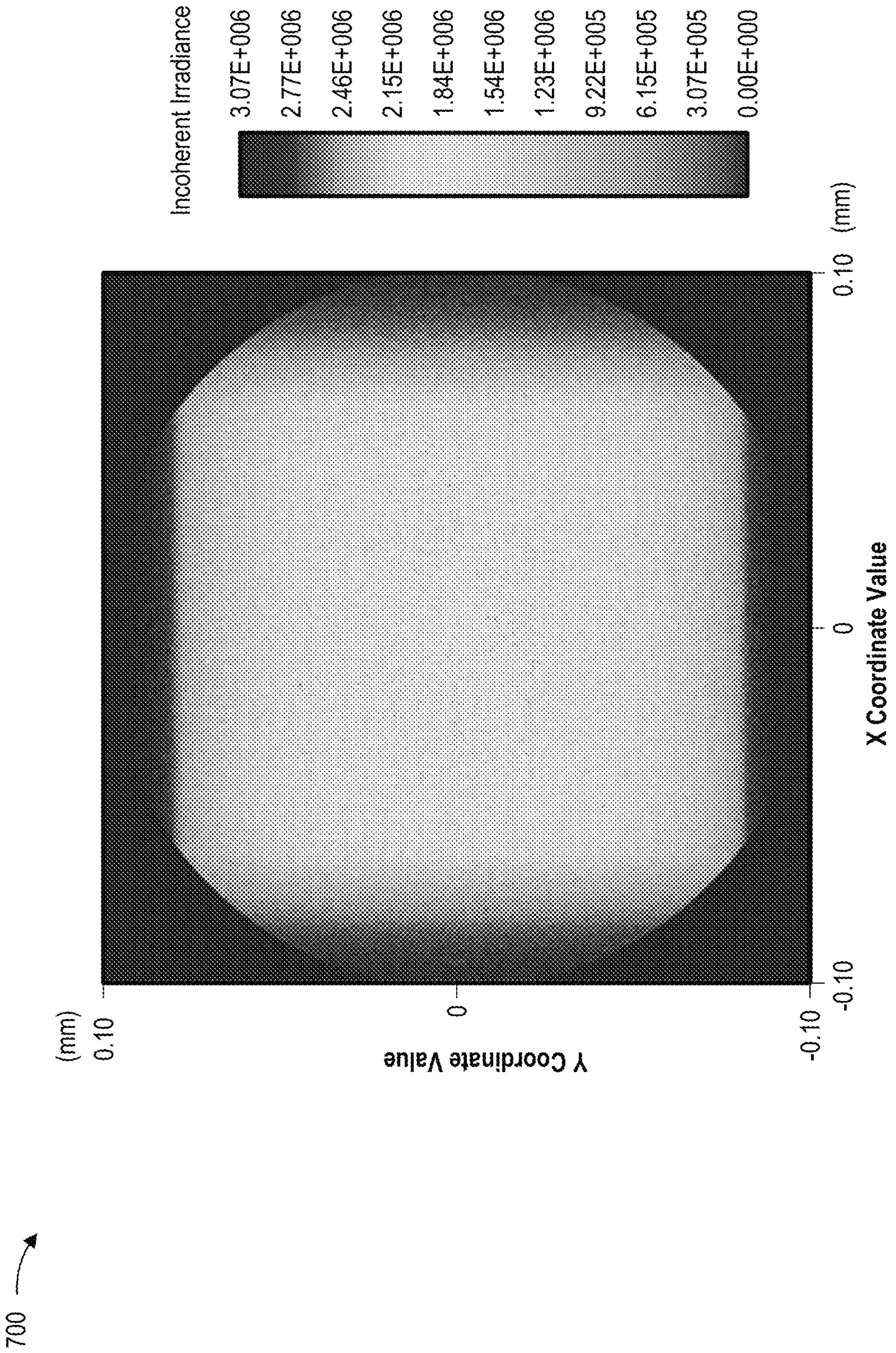

FIGS. 7A-7C illustrate an example implementation 700 of an optical assembly that includes an array of optical modules with double emitters and double Dove prisms described herein. As shown in FIG. 7A, example implementation 700 is an example of a pump module with a column of eight (8) double-emitter BALs or diode lasers, which generally has a similar design as the multi-chip package structure shown in FIG. 2A. For example, as shown in FIG. 7A, the optical assembly includes an array of optical modules, where each optical module includes a diode laser chip, a FAC, and a SAC. In addition, the optical assembly includes a folding mirror per diode laser chip, FAC, and SAC, which are used to couple various laser beams into an optical fiber via a CFAC and a CSAC. However, in contrast to the multi-chip package structure shown in FIG. 2A, each diode laser chip includes two emitters, and a pair of Dove prisms that are aligned with the respective emitters are provided between each combination of a FAC and a SAC to rotate a respective laser beam by 90° and stack the laser beams in the fast axis direction. For example, FIG. 7B illustrates a fast axis stacking for sixteen (16) laser beams that may be generated by the optical assembly shown in FIG. 7A, which includes one column of eight (8) double-emitter diode lasers. Furthermore, FIG. 7C illustrates an example spot diagram for the sixteen (16) laser beams on a coupling tip of the optical fiber, which is shown to approximate a square based on the sixteen (16) laser beams being stacked in the fast axis direction after being rotated by Dove prisms provided between the FACs and the SACs.

Accordingly, because there are two emitters per chip, only 8 chips are needed to achieve a module power rating greater than 300 W (e.g., up to 350 W) using sixteen (16) emitters without using a PBC. The reduced number of laser chips and optical components in the pump module can also reduce a cost per W. Also, the 90° beam rotation provided by the two Dove prisms allows the laser beams to be stacked horizontally (in the fast axis direction) such that the various BALs are all on the same height in the pump module. The pump module design is therefore simpler than a conventional pump module in which the BALs are stacked vertically at different heights. Furthermore, by eliminating the vertical stacking and providing each of the dual-emitter BALs in the array at the same height, all of the laser chips will have the same and the shortest possible thermal path distance to a water cooled heatsink (not explicitly shown) to be attached at the bottom of the optical assembly. Accordingly, in some implementations, all of the laser chips in the optical assembly will share the same thermal resistance, and thus the same junction temperature in the pump module. On the other hand, using the conventional technique of vertical stacking, the highest vertically stacked chips can have a junction temperature much higher than a junction temperature of the lowest vertically stacked chip(s) (e.g., because the chips that are higher are farther away from the water cooled heatsink). Such thermal management difficulty will become more severe when more laser chips are stacked vertically for a pump module with a higher power rating.

As indicated above, FIGS. 7A-7C are provided as an example. Other examples may differ from what is described with regard to FIGS. 7A-7C.

Figure 8A:
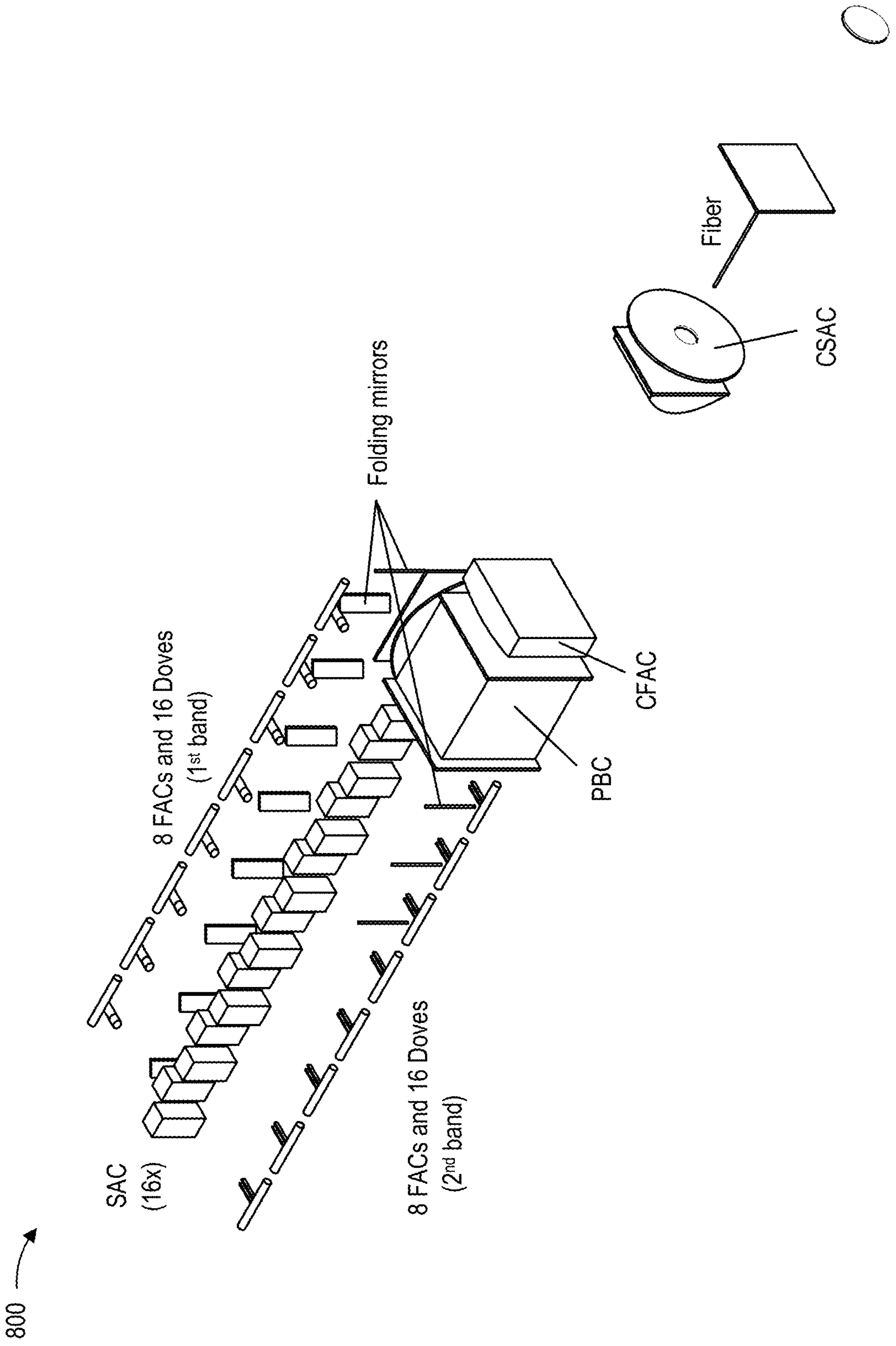
FIGS. 8A-8D illustrate an example implementation of an optical assembly that includes a polarization beam combiner and an array of optical modules with double emitters and double Dove prisms described herein.
Figure 8B:
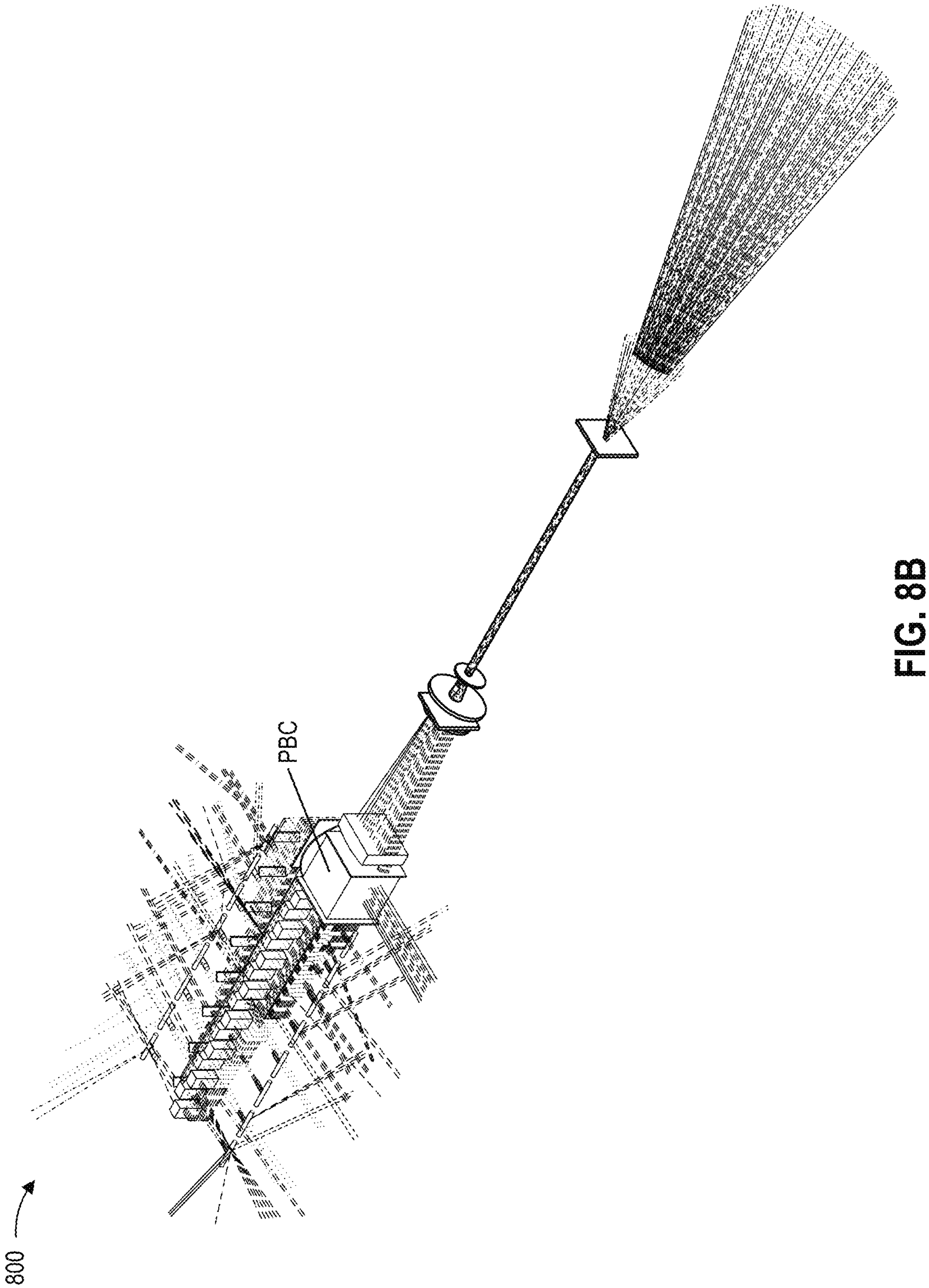

FIGS. 8A-8D illustrate an example implementation 800 of an optical assembly (e.g., a pump module) that includes a PBC and an array of optical modules with double emitters and double Dove prisms described herein. As shown in FIG. 8A, the optical assembly may include an optical module array with two (2) opposing columns that each include eight (8) double-emitter diode lasers (e.g., a total of sixteen (16) emitters per band, or thirty-two (32) total emitters). As further shown, each column (or band) includes 8 FACs that follow the double-emitter diode lasers, and sixteen (16) Dove prisms that are each aligned with a particular emitter to rotate a laser beam emitted by the aligned emitter by 90°, and there are a total of sixteen (16) SACs to collimate the 32 laser beams that are emitted by the various emitters and rotated by the corresponding Dove prisms. Furthermore, as shown in FIGS. 8A-8B, a set of folding mirrors, a PBC, a CFAC, and a CSAC are provided to couple the various laser beams into an optical fiber. In general, FIG. 8A depicts the optical assembly without the laser beams that are emitted by the various emitters, and FIG. 8B depicts the optical assembly with the laser beams.

Figure 8C:
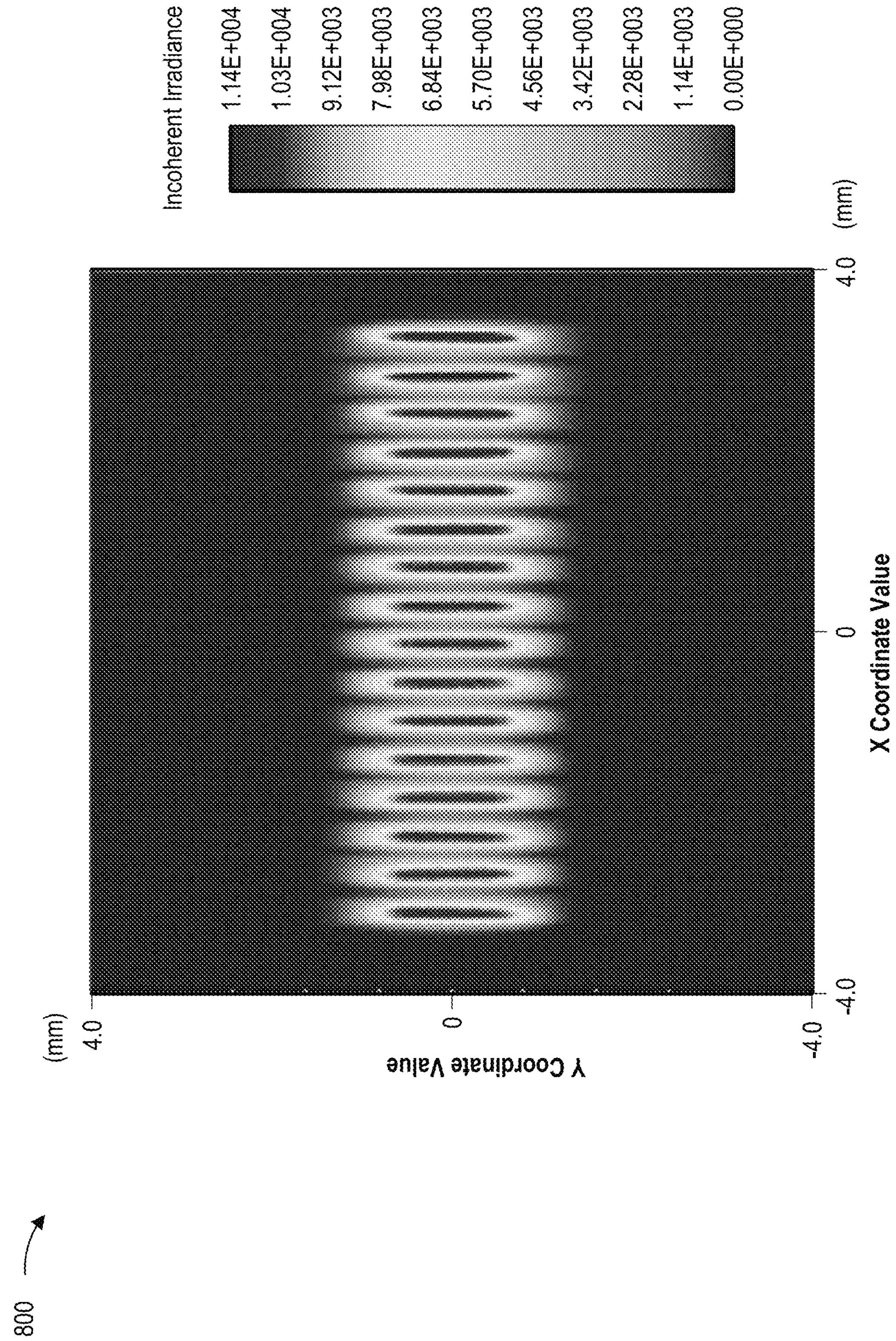
Figure 8D:
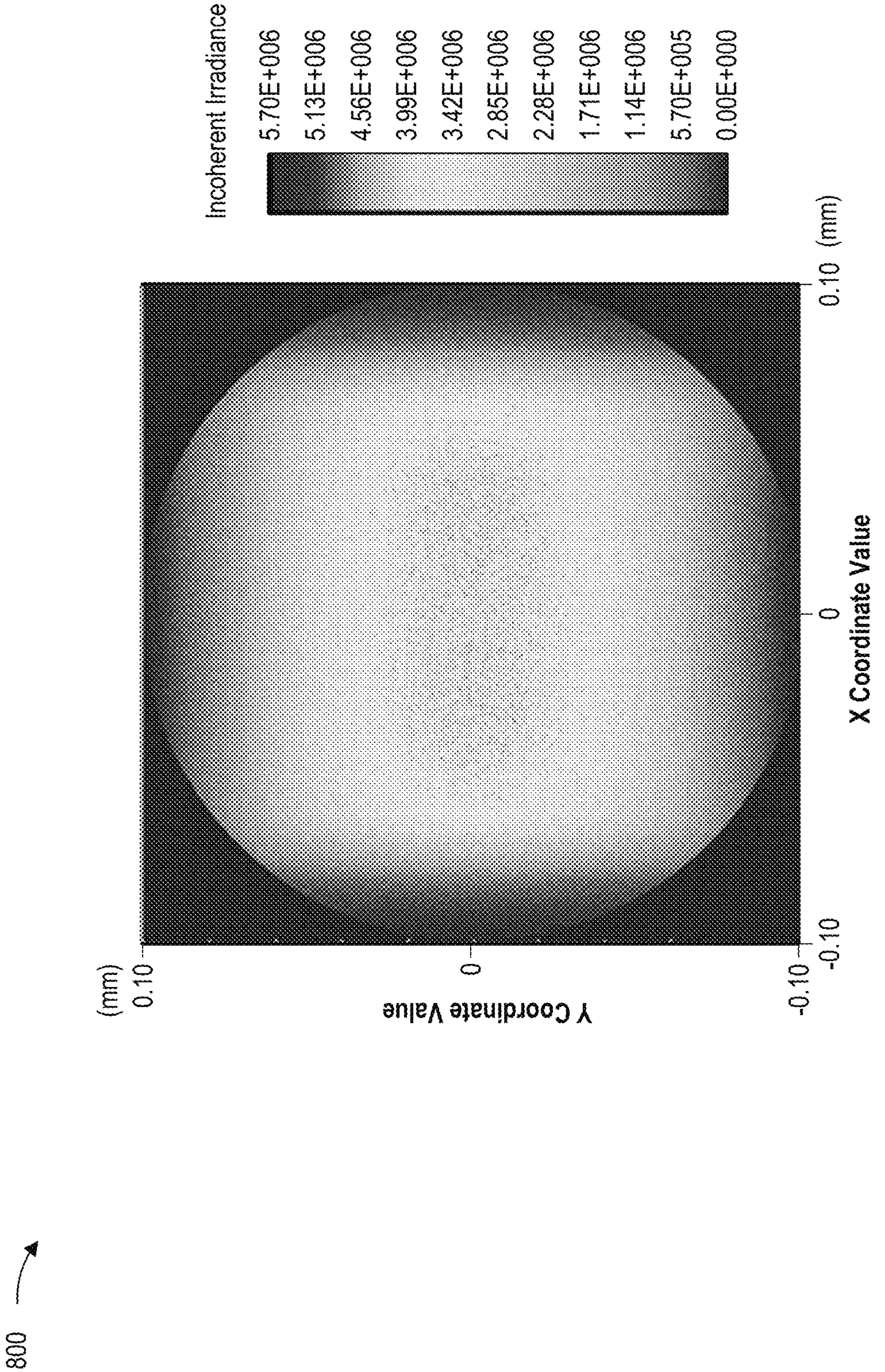

In some implementations, such as in example implementation 800, the PBC is used to combine the laser beams that are emitted by the emitters provided in each bank or column. Accordingly, with two emitter chips per diode laser, sixteen diode lasers can be used to achieve a module power rating up to approximately 700 W. Furthermore, after the 90° beam rotation by the two Dove prisms, the laser beams can be stacked horizontally (in the fast axis) such that all of the diode laser chips are at the same height in the pump module. For example, FIG. 8C illustrates an example laser beam stacking in the horizontal fast axis direction for two overlapping sets of sixteen laser beams that may be generated in the pump module shown in FIGS. 8A-8B, which includes two columns of eight double-emitter diode lasers. Furthermore, FIG. 8D illustrates an example spot diagram on a coupling tip of the optical fiber, which is shown to approximate a square based on the sixteen laser beams per column being stacked in the fast axis direction.

Accordingly, in some implementations described herein, two Dove prisms may generally be used to manipulate two laser beams from the same BAL or diode laser chip, where using two emitters can effectively double the power rating per chip in a high-power pump module. In this way, the cost per W of the pump module is significantly reduced while still coupling laser beams into the same fiber with the same fiber NA and/or the same module beam brightness (e.g., by saving costs on optical components, such as additional FACs and/or SACs).

As indicated above, FIGS. 8A-8D are provided as an example. Other examples may differ from what is described with regard to FIGS. 8A-8D.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical module, comprising:

a diode laser that includes a first emitter configured to emit a first laser beam in a beam propagation direction and a second emitter configured to emit a second laser beam in the beam propagation direction;

a fast axis collimator (FAC) arranged to collimate the first laser beam and the second laser beam in a vertical direction relative to the beam propagation direction;

a slow axis collimator (SAC) arranged after the FAC to collimate the first laser beam and the second laser beam in a horizontal direction relative to the beam propagation direction;

a first Dove prism arranged between the FAC and the SAC; and a second Dove prism arranged between the FAC and the SAC, wherein the first Dove prism and the second Dove prism include respective axes that are rotated relative to the first emitter and the second emitter such that the first laser beam and the second laser beam swap fast and slow axes and are stacked in a fast axis direction after passing through the first Dove prism and the second Dove prism.

2. The optical module of claim 1, wherein the first Dove prism and the second Dove prism are rotated forty-five (45) degrees relative to the first emitter and the second emitter such that that the first Dove prism and the second Dove prism independently and respectively rotate the first laser beam and the second laser beam by ninety (90) degrees.

3. The optical module of claim 1, wherein the fast axis direction is horizontal relative to the beam propagation direction and a slow axis direction is vertical relative to the beam propagation direction after the first laser beam and the second laser beam pass through the first Dove prism and the second Dove prism.

4. The optical module of claim 1, wherein the first Dove prism and the second Dove prism each have one or more corner cuts along a long edge of a top surface.

5. The optical module of claim 4, wherein the one or more corner cuts include one or more of a first cut to surface mount the first Dove prism and the second Dove prism or a second cut to reduce a distance between the first Dove prism and the second Dove prism.

6. The optical module of claim 4, wherein the one or more corner cuts are in respective regions of the first Dove prism and the second Dove prism where no light rays are present while the first laser beam and the second laser beam propagate along respective axes of the first Dove prism and the second Dove prism.

7. The optical module of claim 1, wherein respective centers of the first Dove prism and the second Dove prism are aligned with respective centers of the first emitter and the second emitter in the fast axis direction and a slow axis direction.

8. An optical assembly, comprising:

a coupling fast axis collimator (CFAC) and a coupling slow axis collimator (CSAC) arranged to couple multiple laser beams into an optical fiber; and an array that includes multiple optical devices arranged in one or more rows, wherein the multiple optical devices each include:

a diode laser that includes a first emitter configured to emit a first laser beam in a beam propagation direction and a second emitter configured to emit a second laser beam in the beam propagation direction;

a fast axis collimator (FAC) arranged to collimate the first laser beam and the second laser beam in a vertical direction relative to the beam propagation direction;

a slow axis collimator (SAC) arranged after the FAC to collimate the first laser beam and the second laser beam in a horizontal direction relative to the beam propagation direction;

a first Dove prism arranged between the FAC and the SAC;

a second Dove prism arranged between the FAC and the SAC; and a mirror, arranged after the SAC, to direct the first laser beam and the second laser beam toward the CFAC and the CSAC, wherein the first Dove prism and the second Dove prism include respective axes that are rotated relative to the first emitter and the second emitter such that the first laser beam and the second laser beam swap fast and slow axes and are stacked in a fast axis direction after passing through the first Dove prism and the second Dove prism.

9. The optical assembly of claim 8, wherein the multiple optical devices are arranged at a same height relative to a heatsink such that a thermal resistance and a junction temperature are the same for each of the multiple optical devices.

10. The optical assembly of claim 8, further comprising:

a polarization beam combiner arranged in an optical path after the array and prior to the CFAC and the CSAC that couple the multiple laser beams into the optical fiber.

11. The optical assembly of claim 8, wherein the first Dove prism and the second Dove prism are rotated forty-five (45) degrees relative to the first emitter and the second emitter such that that the first Dove prism and the second Dove prism independently and respectively rotate the first laser beam and the second laser beam by ninety (90) degrees.

12. The optical assembly of claim 8, wherein the fast axis direction is horizontal relative to the beam propagation direction and a slow axis direction is vertical relative to the beam propagation direction after the first laser beam and the second laser beam pass through the first Dove prism and the second Dove prism.

13. The optical assembly of claim 8, wherein the first Dove prism and the second Dove prism each have one or more corner cuts along a long edge of a top surface.

14. The optical assembly of claim 8, wherein respective centers of the first Dove prism and the second Dove prism are aligned with respective centers of the first emitter and the second emitter in the fast axis direction and a slow axis direction.

15. A method, comprising:

emitting, by a first emitter of a diode laser, a first laser beam;

emitting, by a second emitter of the diode laser, a second laser beam;

collimating, by a fast axis collimator (FAC), the first laser beam and the second laser beam in a vertical direction relative to a beam propagation direction;

rotating, by a first Dove prism, the first laser beam by ninety (90) degrees after the first laser beam passes through the FAC;

rotating, by a second Dove prism, the second laser beam by ninety (90) degrees after the second laser beam passes through the FAC; and collimating, by a slow axis collimator (SAC), the first laser beam and the second laser beam in the vertical direction relative to the beam propagation direction after the first laser beam and the second laser beam are rotated by the first Dove prism and the second Dove prism.

16. The method of claim 15, further comprising:

coupling the first laser beam and the second laser beam into an optical fiber after the rotated first laser beam and the rotated second laser beam are collimated by the SAC.

17. The method of claim 15, wherein the first Dove prism and the second Dove prism are rotated forty-five (45) degrees relative to the first emitter and the second emitter such that that the first Dove prism and the second Dove prism independently and respectively rotate the first laser beam and the second laser beam by ninety (90) degrees.

18. The method of claim 15, wherein a fast axis direction of the first laser beam and the second laser beam is horizontal relative to the beam propagation direction and a slow axis of the first laser beam and the second laser beam direction is vertical relative to the beam propagation direction after the first laser beam and the second laser beam pass through the first Dove prism and the second Dove prism.

19. The method of claim 15, wherein the first Dove prism and the second Dove prism each have one or more corner cuts along a long edge of a top surface.

20. The method of claim 15, wherein respective centers of the first Dove prism and the second Dove prism are aligned with respective centers of the first emitter and the second emitter in the fast axis direction and a slow axis direction.

* * * * *